(12) United States Patent
Libby

(10) Patent No.: US 7,367,532 B2
(45) Date of Patent: May 6, 2008

(54) HIGH LIFT LONGITUDINAL AXIS CONTROL SYSTEM

(76) Inventor: John Libby, 6221 Camino Padre Isidoro, Tucson, AZ (US) 85718

( * ) Notice: Subject to any disclaimer, the term of this patent is extended or adjusted under 35 U.S.C. 154(b) by 86 days.

(21) Appl. No.: 11/047,194

(22) Filed: Jan. 31, 2005

(65) Prior Publication Data

US 2006/0169848 A1  Aug. 3, 2006

(51) Int. Cl.
*B64C 9/16* (2006.01)
(52) U.S. Cl. .................. 244/216; 244/198; 244/201
(58) Field of Classification Search ........... 244/216, 244/217, 90 A, 212–213, 215, 201, 34 R, 244/198, 90 R, 204, 211, 123.1
See application file for complete search history.

(56) References Cited

U.S. PATENT DOCUMENTS

| | | | |
|---|---|---|---|
| 1,988,148 A | 1/1935 | Weymouth | |
| 2,222,915 A | 11/1940 | Rebeski | |
| 2,271,763 A | 2/1942 | Fowler | |
| 2,276,688 A | 3/1942 | DeWoitine | |
| 2,282,516 A * | 5/1942 | Gropler et al. | 244/216 |
| 2,289,704 A | 7/1942 | Grant | |
| 2,379,274 A | 6/1945 | Boyd | |
| 2,407,401 A * | 9/1946 | Clauser et al. | 244/216 |
| 2,479,619 A * | 8/1949 | Hilton et al. | 244/216 |
| 2,518,854 A * | 8/1950 | Badenoch | 244/216 |
| 2,583,405 A * | 1/1952 | Youngman | 244/225 |
| 2,585,676 A * | 2/1952 | Poisson-Quinton | 244/208 |
| 2,612,329 A * | 9/1952 | Crandall et al. | 244/217 |
| 2,635,837 A * | 4/1953 | Grant | 244/90 A |
| 2,665,084 A * | 1/1954 | Feeney et al. | 244/217 |
| 2,738,150 A * | 3/1956 | Robinette | 244/90 R |
| 2,746,553 A | 5/1956 | Robertson | |
| 2,747,816 A * | 5/1956 | Howard | 244/45 A |
| 2,760,738 A | 8/1956 | Robertson | |
| 2,938,459 A | 5/1960 | McGraw et al. | |
| 3,253,809 A | 5/1966 | Robertson | |
| 3,332,643 A * | 7/1967 | Toner | 244/7 R |
| 3,446,289 A | 5/1969 | Morris, Jr. | |
| 3,469,807 A | 9/1969 | Morris, Jr. | |
| 3,539,133 A | 11/1970 | Robertson | |
| 3,551,069 A | 12/1970 | Morris, Jr. | |
| 3,614,028 A * | 10/1971 | Kleckner | 244/15 |
| 3,659,810 A | 5/1972 | Robertson | |
| 3,837,601 A * | 9/1974 | Cole | 244/216 |
| 3,853,289 A * | 12/1974 | Nevermann et al. | 244/215 |

(Continued)

FOREIGN PATENT DOCUMENTS

DE          727459        11/1942

(Continued)

OTHER PUBLICATIONS

Flap (B) and aileron (D)—"High Lift Research," Flight, p. 409-410, Youngman et al., Sep. 30, 1948.

*Primary Examiner*—Michael J. Carone
*Assistant Examiner*—Benjamin P Lee
(74) *Attorney, Agent, or Firm*—Ryan Kromholz & Manion, S.C.

(57) ABSTRACT

A bipartite, full span airplane flap system having an inboard flap portion and an outboard flap portion, wherein the outboard flap portion includes an integrated aileron mounted on its substantially equivalent spanwise length.

11 Claims, 7 Drawing Sheets

U.S. PATENT DOCUMENTS

| | | | |
|---|---|---|---|
| 3,904,152 A * | 9/1975 | Gardner | 244/214 |
| 3,910,530 A * | 10/1975 | James et al. | 244/214 |
| 3,912,202 A * | 10/1975 | Jenkins | 244/52 |
| 3,985,319 A * | 10/1976 | Dean et al. | 244/216 |
| 4,049,219 A * | 9/1977 | Dean et al. | 244/217 |
| 4,533,096 A * | 8/1985 | Baker et al. | 244/75.1 |
| 5,992,792 A * | 11/1999 | Arnason | 244/13 |
| 6,079,672 A * | 6/2000 | Lam et al. | 244/217 |
| 6,464,176 B2 * | 10/2002 | Uchida et al. | 244/216 |
| 6,554,229 B1 * | 4/2003 | Lam et al. | 244/217 |
| 6,598,834 B2 * | 7/2003 | Nettle et al. | 244/215 |
| 6,892,982 B2 * | 5/2005 | Clark | 244/36 |
| 2004/0056147 A1 * | 3/2004 | Uchida et al. | 244/10 |

FOREIGN PATENT DOCUMENTS

GB 558048 12/1943

* cited by examiner

HIGH LIFT LONGITUDINAL AXIS CONTROL SYSTEM

BACKGROUND OF THE INVENTION

This invention relates generally to the aviation industry and more specifically to a combination flap and aileron arrangement for improving flight performance at low air speeds.

The desire to land at an airspeed as slow as possible while still maintaining adequate directional control is of ongoing concern in the aviation industry. The ability to maintain adequate airflow over flight control surfaces, such as the ailerons, during slow flight such as landing, increases the number of airports that can be used, but most importantly increases safety of operations. The development of efficient slow flight has included the use of highly cambered airfoils, hinged flaps, slots, spoilers, stall fences, and boundary layer controls devices such as vortex generators. The addition of one of these devices adds to the initial cost and ongoing maintenance cost of the aircraft, the addition of multiple of these devices geometrically increasing costs. The cost to benefit ratio limits the inclusion of these modalities on aircraft.

It is well known that trailing edge flaps on aircraft wings improve performance of the aircraft, particularly in reducing landing speed when the flaps are adjusted to a position which increases wing camber. The highest flap utility is obtained when flaps are coextensive with the wing span. However, since ailerons are necessary to provide lateral control of the aircraft, the flap portion is typically shortened on each wing the amount necessary to accommodate the aileron. Various combinations have been devised endeavoring to maximize both flap and aileron efficiency, however none has been completely satisfactory.

The present invention offers a solution to this problem. The device of the present invention endeavors to lower the stall speed while increasing aileron authority in a cost effective manner. The invention combines the additional lift and laminar flow provided by known Fowler-style flaps with the increased efficiency of known Frise-type ailerons. The unique combination of the present device enables the Frise type aileron component to create lift just as the wing does, and produces greater lateral effect with less deflection of the control. The present invention is further designed to decrease the wing tip vortices at slower speeds, allowing the control to be placed closer to the wing tip where it can also augment its effect through a longer moment arm with less deflection.

SUMMARY OF THE INVENTION

The present invention relates to aircraft having one or more airfoils or wings including extensible flaps. A wing structure according to the invention includes a novel flap assembly that serves in several respects to improve the performance of an aircraft so fitted. The flap assembly of the present invention consists of a combination of interrelated airfoil elements, including flaps, which are arranged with respect to one another in various flight attitudes so as to give improved flight characteristics over known airfoils having flaps.

In general, the shape of a typical subsonic airfoil is designed to produce a differential in air pressure between the upper and lower surfaces, with the upper surface being subjected to a pressure lower than that on the lower surface. This differential produces a net effect of the wing rising toward the area of lower pressure. The reduced pressure experienced by the upper surface is dependent upon laminar flow over the surface. If the airfoil angle of attack is increased or the airfoil curvature is increased, the flow of air near the airfoil trailing edge begins to separate and become turbulent. As the angle of attack and/or the curvature is increased, the point at which separation occurs moves forward on the airfoil, increasing the area of turbulence, until there is no differential in pressure between the upper and lower surfaces of the airfoil, and no lift. The present invention seeks to decrease the total area of turbulent air by augmenting laminar flow over the trailing edge of the airfoil during increased angles of attack and increased curvature by way of a combination of slotted flap and an integrated aileron assembly.

The flap elements of the present invention are of the type which are generally movable rearwardly and downwardly to thereby form a gap or slot between the trailing edge of the main airfoil and the leading edge of the flap. The various elements of the present flap assembly are generally coextensive with main airfoil length and include an inboard flap portion and an outboard flap portion, the outboard portion being further fitted with an integrated aileron.

The present invention provides an airfoil construction which includes the use of substantially full span flaps to thereby reduce the stalling, landing and take off speeds. The airfoil of the present invention further allows a more efficient aileron arrangement that permits maximum lateral control especially during slow airspeeds.

More specifically, the present invention provides an airfoil equipped with a bipartite flap mechanism extending substantially the entire length of the main airfoil. A flap mechanism according to the present invention includes an inboard flap portion and an outboard flap portion whereby substantially the full length of the airfoil trailing edge may be utilized. The invention further integrates the aileron within the outboard flap portion.

It is an object of the present invention to provide an airfoil for an airplane which will increase controllability and maneuverability of the airplane particularly in slow speed situations, without significantly increasing the complexity of design or execution of control.

It is a further object to provide such an airfoil to new airplanes or to modify existing airplanes to improve their characteristics, as discussed above, without significantly increasing the weight or cost of the airplane.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
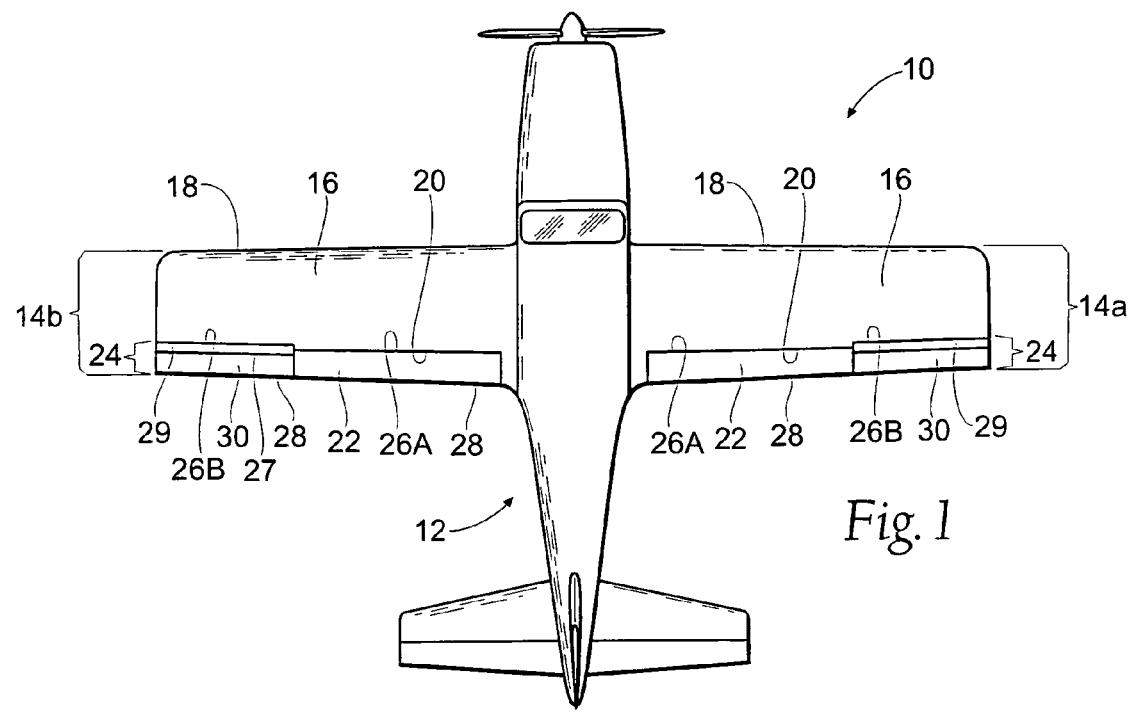
FIG. 1 is a top plan view of an airplane with wings fitted with the flap combination of the present invention.

FIG. 1 of the drawings illustrates an airplane 10 having a fuselage 12 and wing structure comprising a right wing structure 14A and a left wing structure 14B. The main airfoil of each wing structure 14A, 14B is designated by the numeral 16.

Each of the main airfoils 16 includes a leading edge 18 and a trailing edge 20. Each wing structure 14A, 14B further preferably includes an inboard flap portion 22 and an outboard flap portion 24, each of the flap portions 22, 24 having a flap leading edge 26A, 26B, respectively, and a flap trailing edge 28, with the respective flap leading edges 26A, 26B each being located adjacent the airfoil trailing edge 20. Each flap leading edge 26A, 26B is preferably capable of movement with respect to its respective flap trailing edge 28. As seen, the outboard flap portion 24, is preferably comprised of a flap member 29 having an aileron 30 pivotally mounted on its flap member trailing edge 27.

Figure 2:
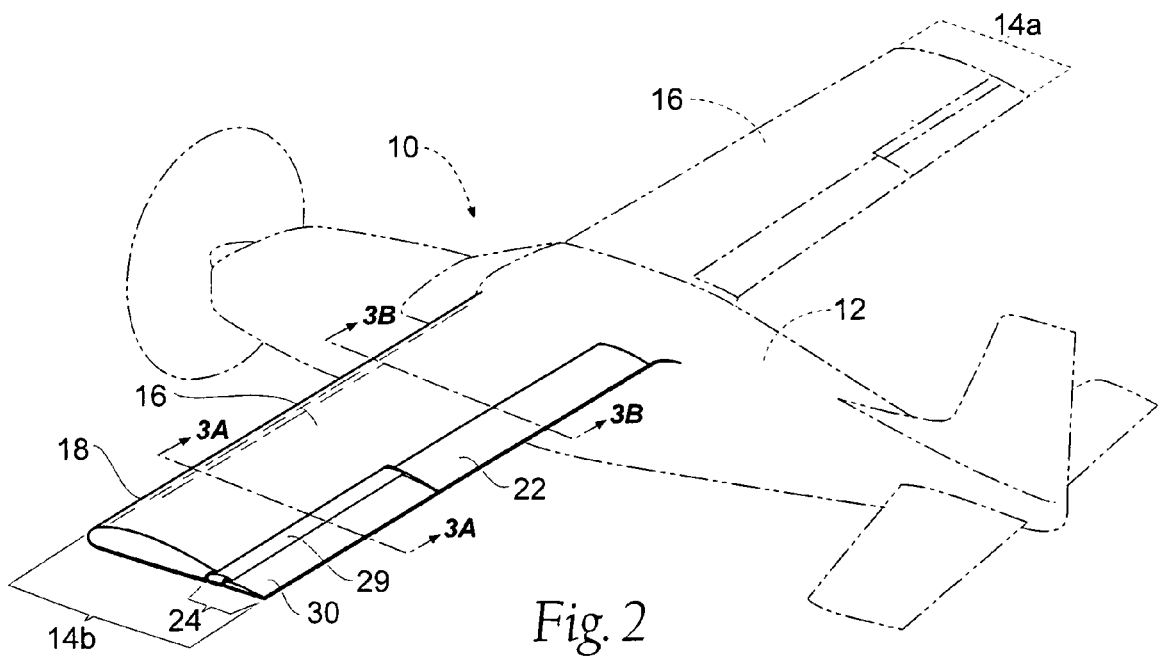
FIG. 2 is a perspective view of an airplane wing fitted with the combination of the present invention and showing the flaps and aileron in retracted and neutral positions, with the airplane shown in phantom.
Figure 3A:
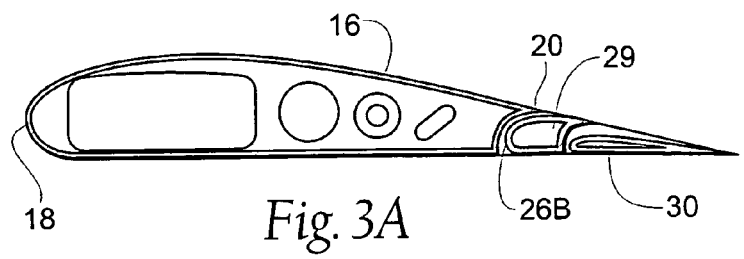
FIG. 3A is a cross section of the wing shown in FIG. 2 and taken along lines 3A-3A thereof, and showing the outboard flap portion.
Figure 3B:
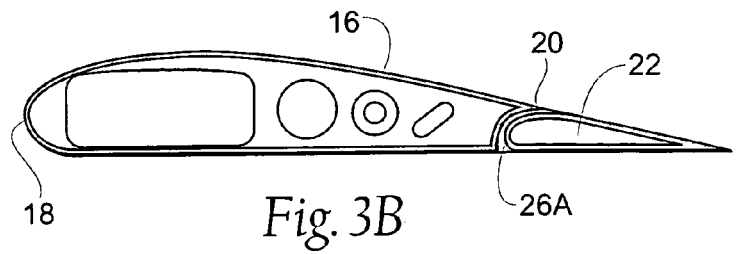
FIG. 3B is a cross section of the wing shown in FIG. 2 and taken along lines 3B-3B thereof, and showing the inboard flap portion.
Figure 4A:
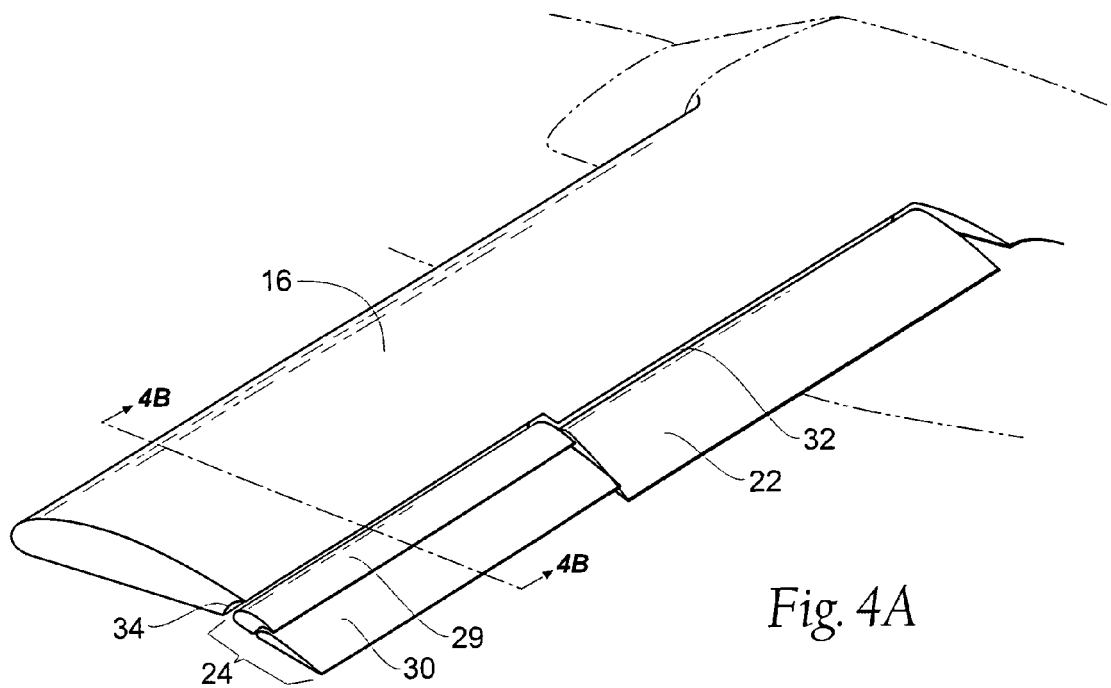
FIG. 4A is a perspective view of an airplane wing fitted with the combination of the present invention, similar to that of FIG. 2, but showing the inboard flap extended approximately 30°, the outboard flap extended approximately 22° and the aileron in neutral position.
Figure 6A:
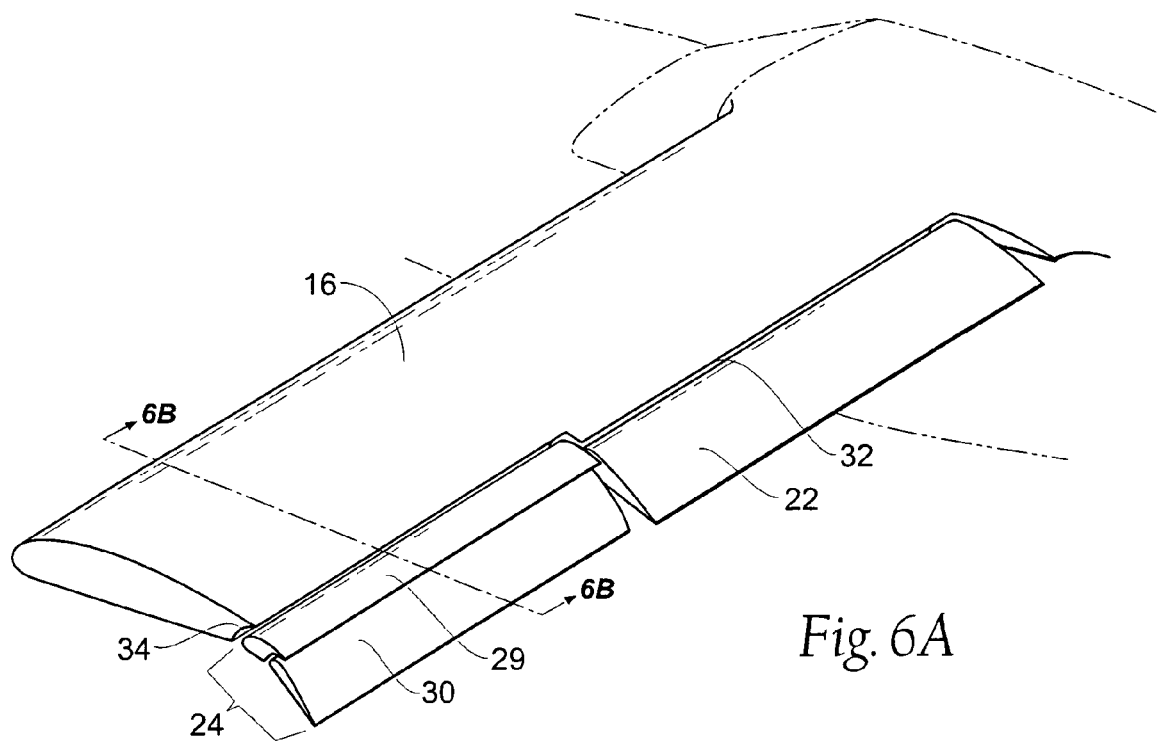
FIG. 6A is a perspective view of an airplane wing fitted with the combination of the present invention, similar to that of FIGS. 2, 4A, and 5A but showing the inboard flap extended approximately 30°, the outboard flap extended approximately 22° and the aileron deflected downward approximately −10°.

As may be seen particularly in the views of FIGS. 2, 3A, and 3B, the inboard flap portion 22 is preferably comprised of a fowler-style flap and is so mounted on each respective main airfoil 16 such that it is rotatable over a limited arcuate range on a spanwise axis, and may be projected fully rearwardly to an extended position as shown in FIGS. 4A and 6A. As may be seen in FIG. 4A, when the inboard flap 22 is projected rearwardly and downwardly a slot 32 is provided between the trailing edge 20 of the main airfoil 16 and the flap leading edge 26A. The outboard flap portion 24 is preferably comprised of a flap member 29 and an inset aileron member 30, such as the Frise-style aileron shown. It is to be understood that while Frise-style ailerons are preferred to thereby minimize adverse yaw and the need for differential deflection of ailerons, other known aileron types may be used. The present arrangement provides maximum lift coefficient while maintaining aileron control at lower speeds.

Figure 4B:
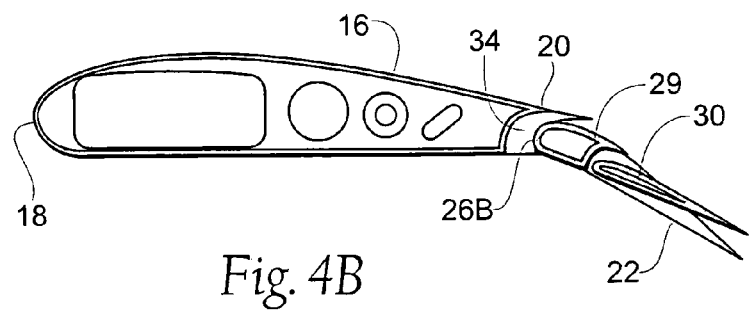
FIG. 4B is a cross section of the wing shown in FIG. 4A and taken along lines 4B-4B thereof.
Figure 5A:
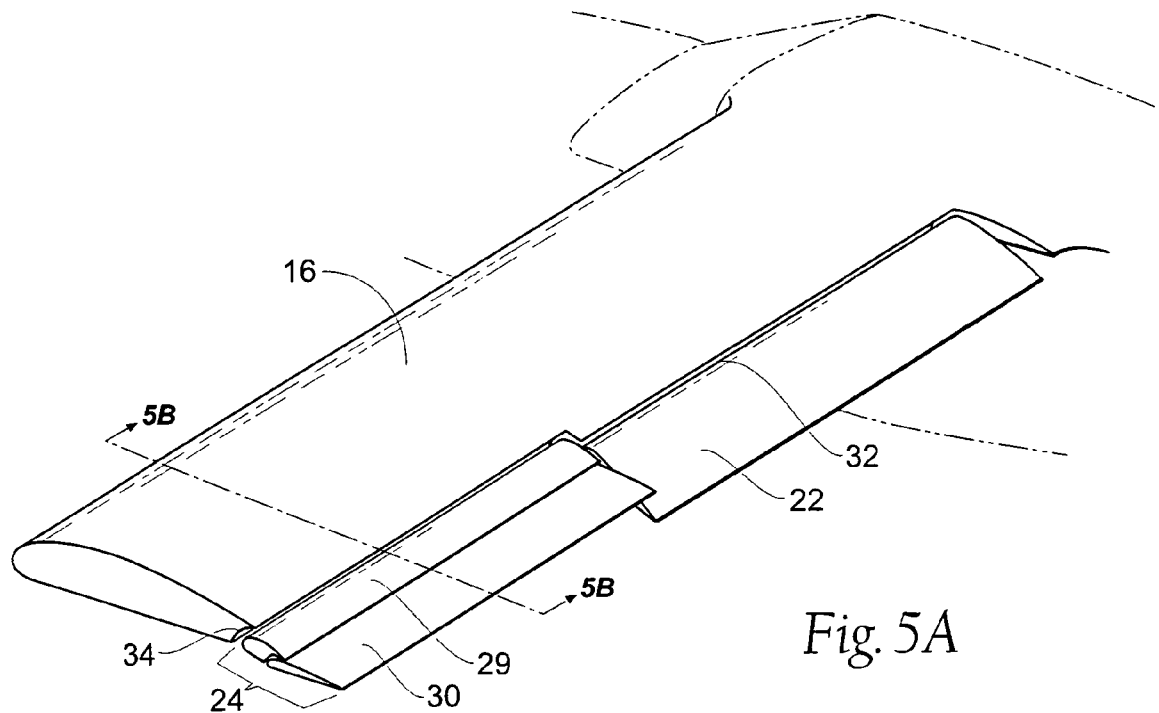
FIG. 5A is a perspective view of an airplane wing fitted with the combination of the present invention, similar to that of FIGS. 2 and 4A, but showing the inboard flap extended approximately 30°, the outboard flap extended approximately 22° and the aileron reflexed approximately 10°.
Figure 5B:
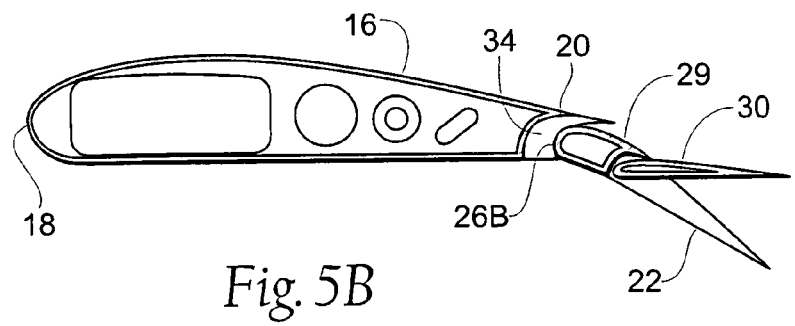
FIG. 5B is a cross section of the wing shown in FIG. 5A and taken along lines 5B-5B thereof.
Figure 6B:
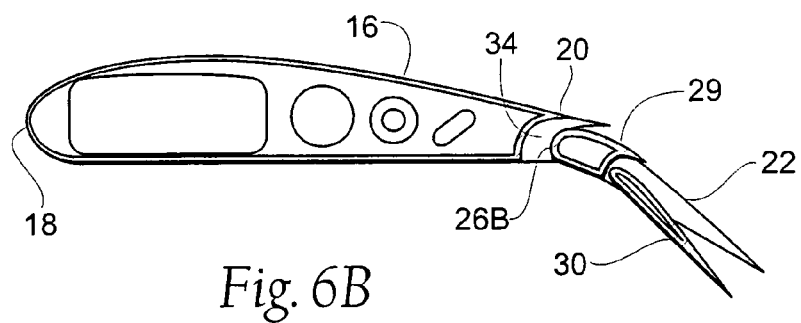
FIG. 6B is a cross section of the wing shown in FIG. 6A and taken along lines 6B-6B thereof.
Figure 7A:
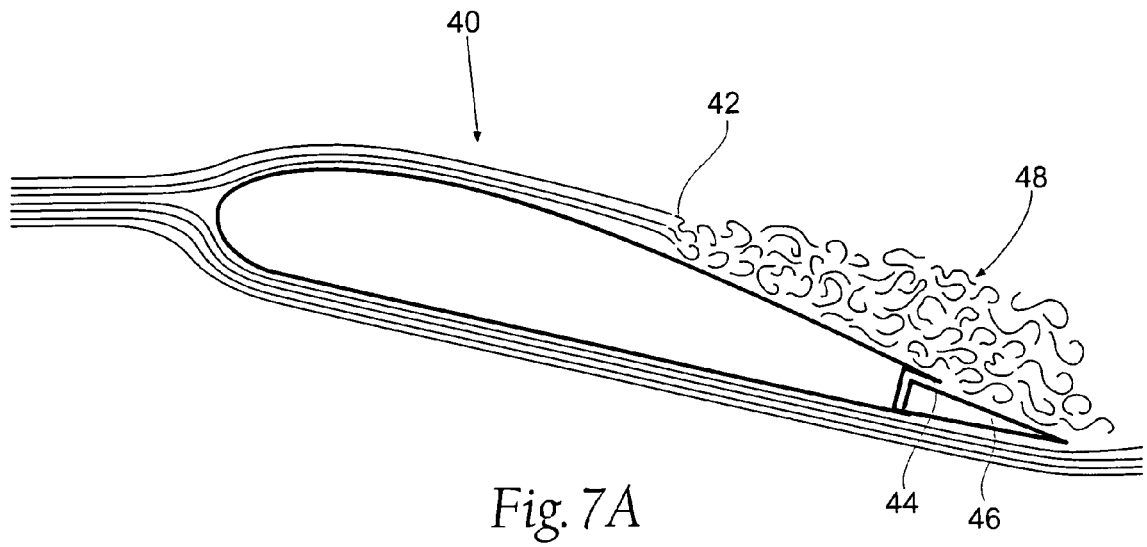
FIG. 7A is a diagrammatic view of a typical wing/control structure and illustrating the separation point of laminar flow and resultant turbulent flow which replaces it adjacent the wing and flap.
Figure 7B:
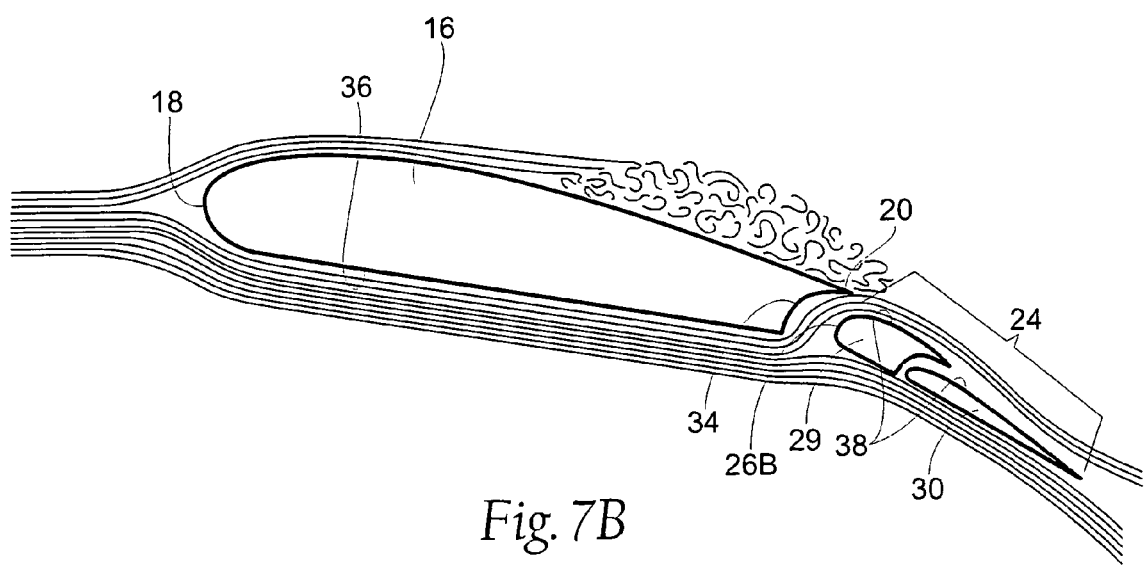
FIG. 7B is a diagrammatic view illustrating the airflow adjacent the outboard flap and aileron combination of the present invention, with the position of adjustment as shown in FIGS. 4A and 4B.

As may be seen particularly in the views of FIGS. 4B, 5B, and 6B, during outboard flap 24 extension a secondary slot 34 is formed between the flap leading edge 26B and the trailing edge 20 of the main airfoil 16. As illustrated particularly in the view of 7B, and as discussed above, the secondary slot 34 functions, similarly to that of slot 32, to draw a portion of higher pressure air from the bottom surface 36 of the airfoil 16, through the secondary slot 34 and distribute it in laminar flow over the top surface 38 of the outboard flap portion 24, consisting of flap member 29 with its integrated aileron 30. This action thereby augments the laminar air flow of the total wing structure 14A, 14B and increases the net lift of the wing structure 14A, 14B through the contribution of lift exerted by the outboard flap portion 24 including the flap member 29 and its integrated aileron 30. This effect is contrasted with the conventional wing 40 illustrated in FIG. 7A. As may be seen, lift is generated forward of the separation point 42, with the trailing edge 44 of the wing structure 40 and the aileron 46 unable to contribute to the overall lift of the wing structure 40 due to the area of turbulence 48 located adjacent those structures. It is to be noted that in addition to the benefits previously discussed, the present arrangement minimizes aileron 30 deflection and size, since laminar airflow is maintained over a substantial area of the aileron 30 surface, allowing it to produce a net moment by means of both displacement and lift. Additionally, general control efficiency is enhanced, since the adverse effect of wing tip vortices at high angles of attack is reduced.

Figure 8:
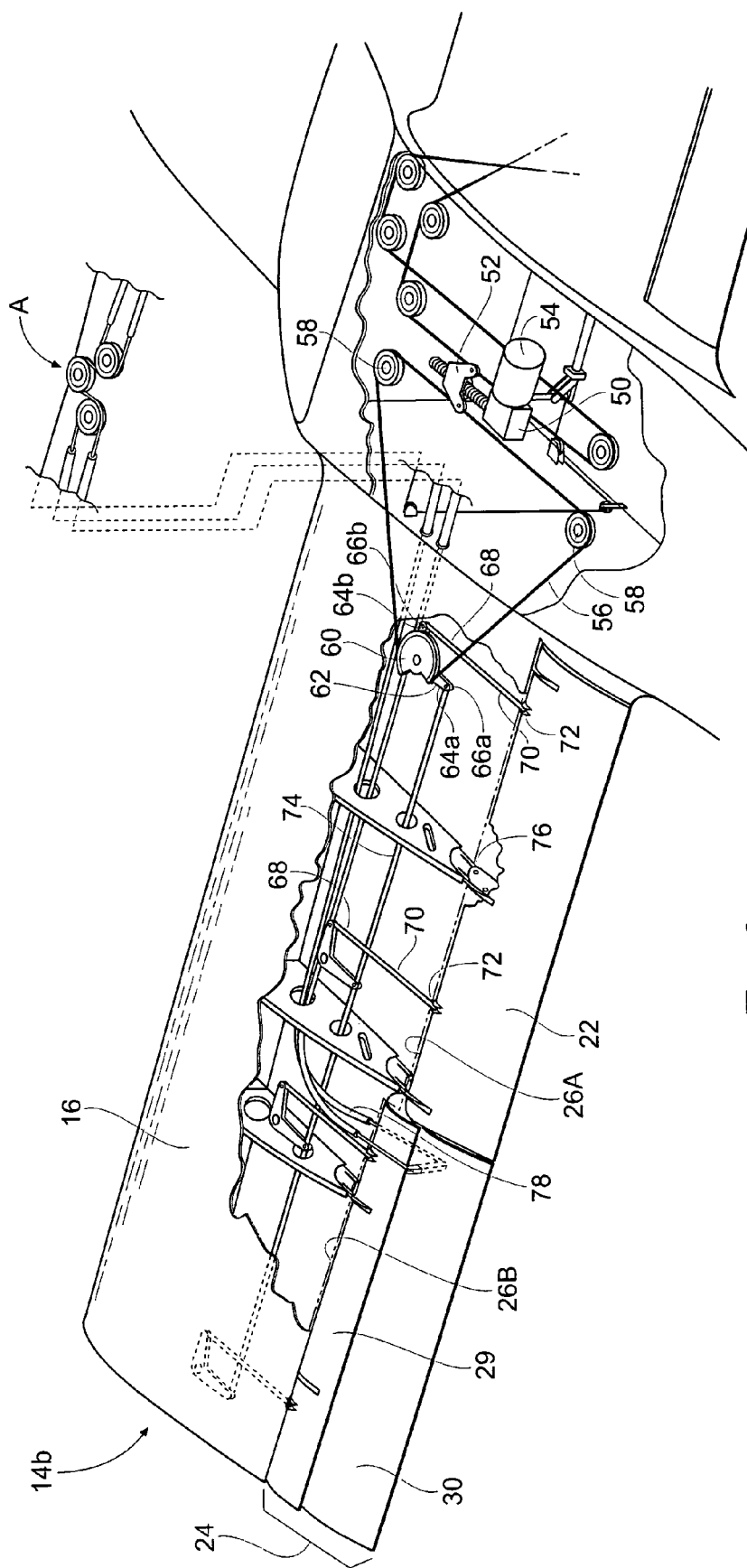
FIG. 8 is a partially cut away view of an airplane wing fitted with the combination of the invention and showing a preferred activating system.

Illustrated in FIG. 8 is a preferred manner in which the flap system of the present invention is mounted on the wing structure 14A, 14B and operated. As seen, a linear actuator 50, including a jackscrew 52 motivated by a prime mover, such as the electric motor 54 shown, is ultimately activated by conventional pilot control means. The actuator 50 is connected to a cable 56, movement of which ultimately moves both inboard flaps 22 and outboard flap members 29, respectively. The cable 56 is supported by idler pulleys 58 and a drive pulley 60. The drive pulley 60 is further attached to a bellcrank 62 having arms 64A, 64B. Rotation of the drive pulley 60 moves the bellcrank arms 64A, 64B and their pivot pins 66A, 66B. Attached to each bellcrank arm 64A and its respective pivot pin 66A is the first end 68 of linkage arm 70. The second ends 72 of each linkage arm 70 are conventionally pivotally attached to a respective leading edge 26A, 26B of the outboard flap member 29 or inboard flap 22. The bellcrank arms 64B are each pivotally attached to an axially reciprocating moveable rod 74, which extends substantially spanwise of the wing structure 14A, 14B. Outboard flap member 29 and inboard flap 22 move in accordance with the contour of cammed internal flap tracks 76, shown. It is to be understood that although conventional internal flap tracks 76 are shown in this view, in some applications, the invention contemplates the use of external linkage operated flaps tracks (not shown). The aileron member 30 of the present invention is conventionally moved independently by push pull tubes 78 and is operated by the pulley system A, shown in FIG. 8, or other known means.

Figure 9:
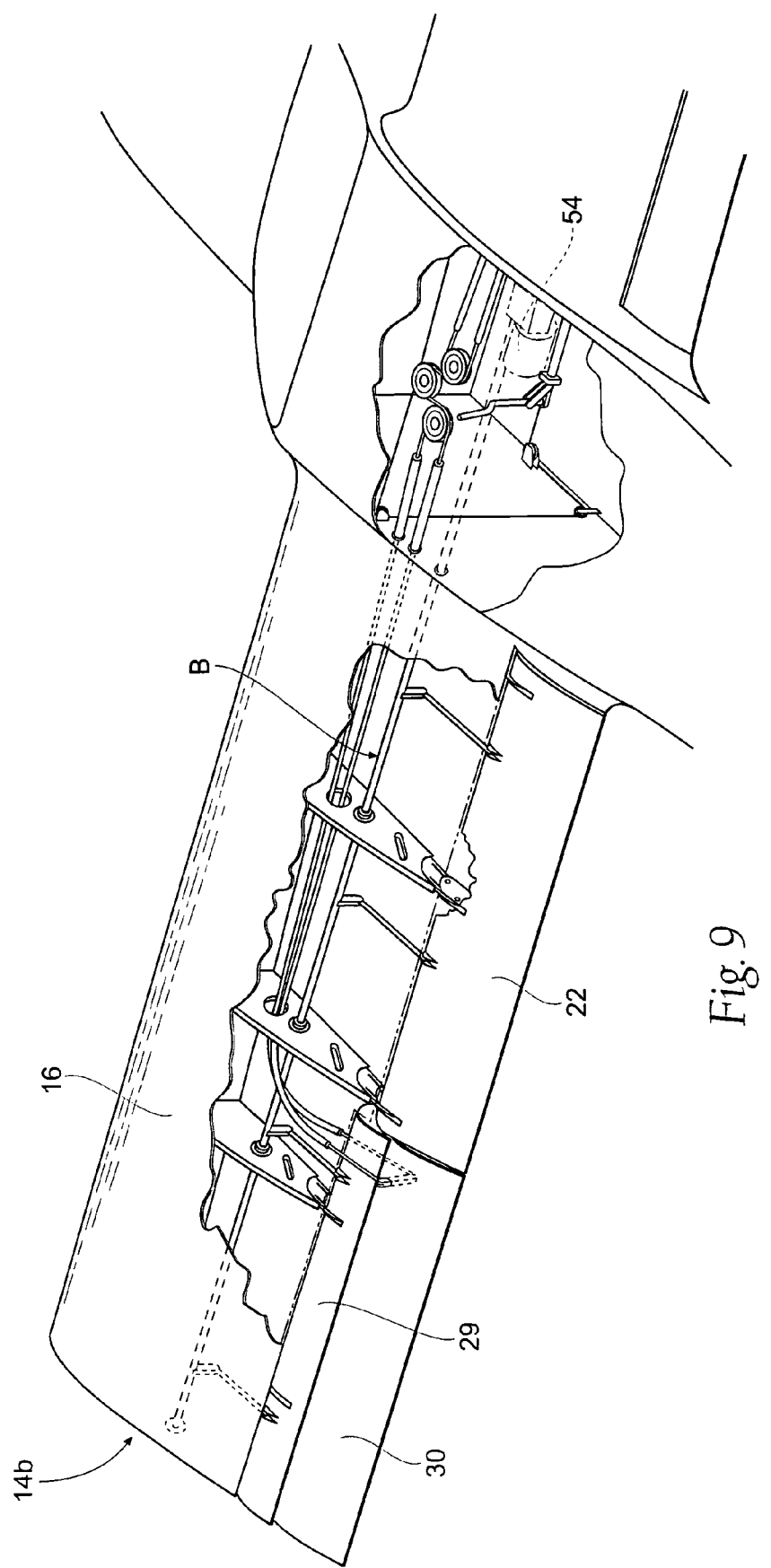
FIG. 9 is a partially cut away view of an airplane wing fitted with the combination of the invention and showing an alternative activating system.

FIG. 9 illustrates an alternative operational system for the present invention, in which the bellcrank 62 and pulley 58, 60 flap drive mechanism shown in FIG. 8 has been replaced by a torque tube drive system B. The torque tube drive system B preferably utilizes a prime mover, such as the motor 54 shown in phantom.

It is to be understood that the right wing structure 14A on the right side of the plane has similar and similarly mounted and related parts.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. An airplane wing having a trailing part and a flap comprising:
    a full span flap having positions including an extreme retracted position and an extreme extended position, said full span flap having two parts, an inboard flap portion and an outboard flap portion;
    said inboard flap portion comprising an inboard flap portion leading part and an inboard flap portion trailing part;
    said outboard flap portion comprising an outboard flap portion leading part and an outboard flap portion trailing part having a fixed distance therebetween;
    a linkage with a fore portion and aft portion extending from wing support structure to the leading part of the flap, a linkage extending from wing support structure to an actuation point located such that the actuation point remains in a constant position with respect to the leading part of the flap when the flap translates between a first and a second position to create a functional slot between a bottom surface of the leading part of the flap and a bottom surface of the wing trailing part to draw a portion of higher pressure air from the bottom surface of the wing through the slot to distribute the higher pressure air over a top surface of the flap;
    means for imparting relative movement between the leading and trailing parts of the flap through movement of the actuation point with respect to the leading part of the flap once the flap translates further toward the second position, wherein the means for imparting relative movement between the leading and trailing parts of the flap through the actuation point includes means for converting movement of the actuation point into a rearward movement of a control linkage;
    said outboard flap portion further including an independently operable, integrated aileron portion, said aileron portion having an aileron portion leading part and an aileron portion trailing part;
    said aileron portion leading part being pivotally attached to said outboard flap portion trailing part such that said aileron portion leading part is mounted adjacent said outboard flap portion trailing part and said aileron portion extending along said outboard flap portion substantially spanwise length; and
    said outboard flap portion trailing part and all of said integrated aileron portion being located aft of said wing trailing part when said full span flap is in an extreme retracted position.

2. An airfoil having a trailing edge and a full span, bipartite flap, said bipartite flap having positions including an extreme retracted position and an extreme extended position, said bipartite flap adapted to translate between a first and a second position to create a functional slot between a bottom surface of a leading part of said bipartite flap and a bottom surface of the airfoil trailing edge to draw a portion of higher pressure air from the bottom surface of the airfoil through the slot to distribute the higher pressure air over a top surface of the bipartite flap;
    said bipartite flap including an inboard flap portion and an outboard flap portion;
    said inboard flap portion including an inboard flap portion leading edge and an inboard flap portion trailing edge;
    said outboard flap portion including an outboard flap portion leading edge and an outboard flap portion trailing edge;
    said outboard flap portion including a flap member and an aileron member, said flap member having a flap member leading edge and a flap member trailing edge having a fixed distance therebetween, said aileron member having an aileron member lead edge and an aileron member trailing edge;
    said aileron member being pivotally mounted such that said aileron member leading edge is located adjacent said flap member trailing edge;
    said flap member trailing edge of said outboard flap portion and all of said aileron member being located aft of said airfoil trailing edge when said bipartite flap is in an extreme retracted position;
    means for imparting relative movement between the leading and trailing edge of each of said inboard flap portion and said outboard flap portion;
    said means for imparting relative movement comprises at least a first linkage member and a second linkage member, each of said first linkage member and said second linkage member being disposed for reciprocating push pull movement transversely relative to a substantially spanwise axis of said airfoil, each respective first linkage member and said second linkage member having a first end and a second end, said first end of said first linkage member being pivotally attached to said inboard flap leading edge and said first end of said second linkage member being pivotally attached to said flap member leading edge for reciprocal movement of said flap member leading edge and said inboard flap leading edge relative to said spanwise axis; and
    a pivotally operable bell crank lever including a pair of normally disposed, bifurcated arms, the second end of at least one of said first linkage member and said second linkage member being pivotally attached to one of said arms;
    said bellcrank member including another arm pivotally attached to an operating rod, said operating rod being arranged for reciprocating axial movement for pivotal operation of said bellcrank and consequent reciprocating axial movement of said linkage member.

3. The airfoil of claim 2 further including control means for said means for imparting relative movement.

4. The airfoil of claim 3 wherein said control means for said means for imparting relative movement comprises:
    a reciprocally moveable linear actuator; and
    a prime mover for operating said linear actuator.

5. The airfoil of claim 2 wherein only said outboard flap portion of said full span, bipartite flap is partitioned spanwise to provide a flap member and an aileron member.

6. An airfoil having a trailing edge and a full span, bipartite flap, said bipartite flap having positions including an extreme retracted position and an extreme extended position, said bipartite flap adapted to translate between a first and a second position to create a functional slot between a bottom surface of a leading part of said bipartite flap and a bottom surface of the airfoil trailing edge to draw a portion of higher pressure air from the bottom surface of the airfoil through the slot to distribute the higher pressure air over a top surface of the bipartite flap;

said bipartite flap including an inboard flap portion and an outboard flap portion;

said inboard flap portion including an inboard flap portion leading edge and an inboard flap portion trailing edge;

said outboard flap portion including an outboard flap portion leading edge and an outboard flap portion trailing edge;

said outboard flap portion including a flap member and an aileron member, said flap member having a flap member leading edge and a flap member trailing edge having a fixed distance therebetween, said aileron member having an aileron member lead edge and an aileron member trailing edge;

said aileron member being pivotally mounted such that said aileron member leading edge is located adjacent said flap member trailing edge;

said flap member trailing edge of said outboard flap portion and all of said aileron member being located aft of said airfoil trailing edge when said bipartite flap is in an extreme retracted position;

means for imparting relative movement between the leading and trailing edge of each of said inboard flap portion and said outboard flap portion;

control means for said means for imparting relative movement, wherein said control means for said means for imparting relative movement comprises a reciprocally moveable linear actuator and a prime mover for operating said linear actuator; and said means for imparting relative movement includes a pulley-operated, endwise movable, cable having a first end and a second end, said cable being supported by a drive pulley and being attached at each of said first end and said second end to accurately spaced locations on said drive pulley, said cable being further moveably supported by spaced apart idler pulleys and being attached to said linear actuator for reciprocal movement therewith.

7. The airfoil of claim 6 wherein said drive pulley is further attached to a bellcrank lever.

8. An airplane wing comprising:

a main airfoil, said main airfoil having a leading edge and a trailing edge;

a full span flap structure, said full span flap structure including an inboard flap portion and an outboard flap portion;

said inboard flap portion having an inboard flap leading edge and an inboard flap trailing edge; said inboard flap leading edge being movably located adjacent said trailing edge of said main airfoil;

said outboard flap portion being partitioned spanwise to provide a flap member and an aileron member, said flap member having a flap member leading edge and a flap member trailing edge having a fixed distance therebetween; said flap member leading edge being movably located adjacent said trailing edge of said main airfoil, said aileron member being pivotally mounted adjacent to said flap member trailing edge;

adjustable mounting means on said wing for said full span flap structure;

control means for said adjustable mounting means to selectively move the respective axis of each of said outboard flap portion and said inboard flap portion in a generally aft and substantially downward direction to positions between and including an extreme retracted position in which said flap member trailing edge of said outboard flap portion and all of said aileron member are located aft of said airfoil trailing edge, and an extreme extended position of substantial aft displacement of the inboard flap structure and the outboard flap structure from the main airfoil in which said inboard flap leading edge and a substantially spanwise portion of said trailing edge of said main airfoil cooperate to form a first slot therebetween, and said flap member leading edge and a substantially spanwise portion of said trailing edge of said main airfoil cooperate to form a second slot therebetween, the second slot comprising a functional slot between a bottom surface of said flap member leading edge and a bottom surface of said trailing edge of said main airfoil to draw a portion of higher pressure air from the bottom surface of said main airfoil through the second slot to distribute the higher pressure air over a top surface of said flap member;

said adjustable mounting means comprises at least a first linkage member and a second linkage member, each of said first linkage member and said second linkage member being disposed for reciprocating push pull movement transversely relative to a substantially spanwise axis of said wing, each respective first linkage member and said second linkage member having a first end and a second end, said first end of said first linkage member being pivotally attached to said inboard flap leading edge and said first end of said second linkage member being pivotally attached to said flap member leading edge for reciprocal movement of said flap member leading edge and said inboard flap leading edge relative to said spanwise axis; and a pivotally operable bell crank lever including a pair of normally disposed, bifurcated arms, the second end of at least one of said first linkage member and said second linkage member being pivotally attached to one of said arms;

said bellcrank member including another arm pivotally attached to an operating rod, said operating rod being arranged for reciprocating axial movement for pivotal operation of said bellcrank and consequent reciprocating axial movement of said linkage member.

9. The airplane wing of claim 8 wherein said control means for said adjustable mounting means comprises:

a reciprocally moveable linear actuator; and a prime mover for operating said linear actuator.

10. An airplane wing comprising:

a main airfoil, said main airfoil having a leading edge and a trailing edge;

a full span flap structure, said full span flap structure including an inboard flap portion and an outboard flap portion;

said inboard flap portion having an inboard flap leading edge and an inboard flap trailing edge; said inboard flap leading edge being movably located adjacent said trailing edge of said main airfoil;

said outboard flap portion being partitioned spanwise to provide a flap member and an aileron member, said flap member having a flap member leading edge and a flap member trailing edge having a fixed distance therebetween; said flap member leading edge being movably located adjacent said trailing edge of said main airfoil, said aileron member being pivotally mounted adjacent to said flap member trailing edge;

adjustable mounting means on said wing for said full span flap structure;

control means for said adjustable mounting means to selectively move the respective axis of each of said outboard flap portion and said inboard flap portion in a generally aft and substantially downward direction to positions between and including an extreme retracted position in which said flap member trailing edge of said outboard flap portion and all of said aileron member are located aft of said airfoil trailing edge, and an extreme extended position of substantial aft displacement of the inboard flap structure and the outboard flap structure from the main airfoil in which said inboard flap leading edge and a substantially spanwise portion of said trailing edge of said main airfoil cooperate to form a first slot therebetween, and said flap member leading edge and a substantially spanwise portion of said trailing edge of said main airfoil cooperate to form a second slot therebetween, the second slot comprising a functional slot between a bottom surface of said flap member leading edge and a bottom surface of said trailing edge of said main airfoil to draw a portion of higher pressure air from the bottom surface of said main airfoil through the second slot to distribute the higher pressure air over a top surface of said flap member;

said control means for said adjustable mounting means comprises a reciprocally moveable linear actuator and a prime mover for operating said linear actuator; and said adjustable mounting means includes a pulley-operated, endwise movable, cable having a first end and a second end, said cable being supported by a drive pulley and being attached at each of said first end and said second end to arcuately spaced locations on said drive pulley, said cable being further moveably supported by spaced apart idler pulleys and being attached to said linear actuator for reciprocal movement therewith.

11. The airplane wing of claim 10 wherein said drive pulley is further attached to a bellcrank lever.

* * * * *